United States Patent
Donnelly et al.

(10) Patent No.: US 10,463,180 B1
(45) Date of Patent: Nov. 5, 2019

(54) CANDLE DECKS AND COVERS FOR CAKES AND CUPCAKES

(71) Applicant: Brian Donnelly, East Northport, NY (US)

(72) Inventors: Brian Donnelly, East Northport, NY (US); Samuel Notaro, Riverhead, NY (US)

( * ) Notice: Subject to any disclaimer, the term of this patent is extended or adjusted under 35 U.S.C. 154(b) by 0 days.

(21) Appl. No.: 16/456,207

(22) Filed: Jun. 28, 2019

Related U.S. Application Data

(63) Continuation-in-part of application No. 29/655,769, filed on Jul. 6, 2018.

(60) Provisional application No. 62/694,804, filed on Jul. 6, 2018.

(51) Int. Cl.
| | |
|---|---|
| *A47G 19/00* | (2006.01) |
| *A47G 19/02* | (2006.01) |
| *F21V 35/00* | (2006.01) |
| *A21D 13/80* | (2017.01) |
| *F21W 121/00* | (2006.01) |

(52) U.S. Cl.
CPC ............ *A47G 19/02* (2013.01); *A21D 13/80* (2017.01); *F21V 35/006* (2013.01); *F21W 2121/002* (2013.01)

(58) Field of Classification Search
CPC ...... A47G 19/02; A47G 19/26; A47G 19/022; A47G 2400/061; A47G 2200/08; A21D 13/80; F21V 35/006; F21W 212/002; B65D 73/00
USPC .................................. 206/457, 100; 431/295
See application file for complete search history.

(56) References Cited

U.S. PATENT DOCUMENTS

| | | | |
|---|---|---|---|
| 1,125,855 | A | 1/1915 | Mapes |
| 1,511,004 | A | 10/1924 | Pooch |
| 1,778,597 | A | 10/1930 | Herzog |
| 1,879,477 | A | 9/1932 | Powell |
| 1,982,723 | A | 12/1934 | Bantleon |
| 2,170,040 | A | 8/1939 | Stuart |
| 2,303,540 | A | 6/1940 | Montgomery |
| 2,316,342 | A | 4/1942 | Krieg |
| 2,347,041 | A | 4/1944 | Filsinger |
| 2,393,767 | A | 1/1946 | Gould |
| 2,406,777 | A | 9/1946 | Koretzky |
| 2,468,505 | A | 4/1949 | Mineill |
| D157,043 | S | 1/1950 | Gruber |
| 2,617,350 | A | 11/1952 | Shol |
| 2,758,458 | A | 8/1956 | Carlson |

(Continued)

FOREIGN PATENT DOCUMENTS

| | | |
|---|---|---|
| FR | 2592782 A1 | 7/1987 |
| WO | 2009111821 A1 | 9/2009 |

*Primary Examiner* — Ernesto A Grano
(74) *Attorney, Agent, or Firm* — Alfred M. Walker

(57) ABSTRACT

A sanitary cover for cakes includes a base serving as a platter for the cake as well as a storage compartment for a removable candle deck when not in use. The cake cover is placed atop the base platter and the candle deck is positioned and securely lockable to an upper recess of the cake cover. The candle deck is held securely in position with circumferential sliding connecting unit locks, which are cantilevered inward from the rim of the depression on top of the cake cover and which are engageable with sliding tabs of the candle deck. A central molded integral handle is provided on top of the cake cover, and the integral handle extends through a corresponding central hole in the center of the candle deck.

18 Claims, 9 Drawing Sheets

(56) References Cited

U.S. PATENT DOCUMENTS

| | | |
|---|---|---|
| D183,456 S | 9/1958 | Henderson |
| 2,852,054 A | 9/1958 | Motely |
| 2,924,330 A | 2/1960 | Ballard |
| 2,960,770 A | 11/1960 | Valenta |
| 2,997,788 A | 8/1961 | Gilbert |
| 3,076,577 A | 2/1963 | Craig |
| 3,204,359 A | 9/1965 | Kurokawa |
| 3,736,214 A * | 5/1973 | McBirnie ............... A47G 19/26 428/7 |
| 3,819,455 A | 6/1974 | MacKendrick |
| 4,206,845 A | 6/1980 | Christian |
| 4,219,119 A | 8/1980 | Zefran |
| 4,359,159 A | 11/1982 | Pollard |
| 4,385,554 A | 5/1983 | Daenen |
| 4,663,506 A | 5/1987 | Bowen |
| 4,721,455 A | 1/1988 | Barfus |
| 4,884,966 A | 12/1989 | Wexler |
| 4,938,688 A | 7/1990 | Wexler |
| 5,096,274 A | 3/1992 | Fuschetto |
| D333,410 S | 2/1993 | Panzarello |
| 5,582,478 A | 12/1996 | Ambrosino |
| 5,673,802 A | 10/1997 | Valentino |
| D446,083 S | 8/2001 | Marsh |
| D455,850 S | 4/2002 | Haskins |
| 6,607,377 B2 | 8/2003 | Latzel |
| D490,276 S | 5/2004 | Pereira |
| 6,736,632 B2 | 5/2004 | Wolter |
| 6,892,883 B1 | 5/2005 | Brumfield et al. |
| D572,539 S | 7/2008 | Swinford et al. |
| D584,926 S | 1/2009 | Ethier |
| D633,654 S | 3/2011 | Berkete |
| 8,056,751 B2 | 11/2011 | Vovan |
| 8,307,982 B1 | 11/2012 | Vovan |
| 8,459,456 B2 | 6/2013 | Donnelly |
| 8,668,088 B2 | 3/2014 | Donnelly |
| D712,705 S * | 9/2014 | Fitzpatrick ..................... D7/610 |
| D738,546 S * | 9/2015 | Aubrey ......................... D26/22 |
| 2003/0136277 A1 | 7/2003 | Okros |
| 2004/0224271 A1 | 11/2004 | Langsam |
| 2004/0244604 A1 | 12/2004 | Slagter |
| 2005/0056162 A1 | 3/2005 | Milligan |
| 2005/0087459 A1 | 4/2005 | Slagter |
| 2006/0115781 A1 | 6/2006 | Greiner |
| 2006/0130677 A1 | 6/2006 | Chou |
| 2007/0009846 A1* | 1/2007 | Bolanos ................... F23D 3/24 431/320 |
| 2007/0048680 A1 | 3/2007 | Cartledge |
| 2009/0181335 A1 | 7/2009 | Tropeano |

* cited by examiner

CANDLE DECKS AND COVERS FOR CAKES AND CUPCAKES

RELATED APPLICATIONS

This application claims priority from provisional application No. 62/694,804 filed Jul. 6, 2018, under 35 USC § 119 (e). The '804 is incorporated by reference herein.

FIELD OF THE INVENTION

The present invention relates to improved sanitary cake covers with removable candle decks.

BACKGROUND

The U.S. Pat. Nos. 8,459,456 and 8,668,088 of Brian Donnelly form the relevant prior art to Applicant Donnelly's present invention. The present invention shares many of the functional features and objects of the two prior inventions, while improving the human interface and at the same time reducing manufacturing and parts cost.

The principal function of providing a sanitary cover with a removable candle deck for cakes and cupcakes is maintained, but the attachment method of the two parts has changed. While in the prior art patents mentioned above the candle deck is attached via a threaded fastener, in the present patent simplified yet effective mechanical sliding connecting unit locks are used. Separate parts such as a removable top knob, threaded nut, top retaining screw and under platter threaded screw and nut have been eliminated. These could easily get separated and lost, rendering the feature unusable.

OBJECTS OF THE INVENTION

It is therefore an object of the present invention to provide an improved sanitary cake cover with a removable candle deck having an ergonomic user interface for locking and unlocking the candle deck upon, and off of, the transparent cake cover.

It is also an object of the present invention to provide a molded integral central handle for the cake cover, to be used with or without the candle deck, which utilizes fewer moving parts and which promotes easy locking and unlocking of the candle deck upon, and off of, the cake cover.

Other objects which become apparent from the following description of the present invention.

SUMMARY OF THE INVENTION

In keeping with these objects and others which may become apparent, the present invention includes a preferably transparent sanitary cover for cakes which further includes a base serving as a platter for the cake, as well as a lower platter storage compartment for a removable candle deck when not in use. The cake cover is placed atop the base platter and the candle deck is positioned and securely locked to an upper recess of the cake cover with an interlock device.

The candle deck is held securely in position with sliding connecting tabs, which mate with sliding connecting unit locks, i.e. interlock fasteners, such as, for example, circumferential sliding twist lock connecting interlock units, which are cantilevered inward from the rim of the depression on top of the cake cover. A central integral built-in handle is provided on top of the cake cover, and the integral handle extends through a corresponding central hole in the center of the candle deck, to remove both the candle deck and the cover from the base platter supporting the cake thereon. Side support gripping handles on the candle deck are used to support and twist the candle deck, to interact with the circumferential locking connection units on the periphery of the cover rim, to lock or unlock the candle deck to and from the top of the cake cover. These locking connecting units work in unison and interact with the sliding locking tabs, which emanate from notches on each side of candle deck.

In contrast to the present invention, in the prior art of U.S. Pat. No. 8,668,088 of Donnelly, a knob with a treaded extension is used to attach the candle deck to the top surface of the cake cover, via a fastener nut on the inside of the cover (see knob 5 and nut 8 in FIG. 1 of U.S. Pat. No. 8,668,088 of Donnelly). These have been replaced by an integrally molded central knob or handle in the top of the cake cover, preferably in the shape of a truncated cone. A pair of sliding twist-lock connecting unit tabs, integrally molded with the candle deck, is used to attach it to the top of the cake cover via molded-in features such as locking connecting units in the top recess rim of the cake cover. While the prior art latches 39 and 49 of Donnelly '088 attach the base 38 to cover 36 in FIGS. 4 and 8 of Donnelly '088, the locking connecting units and tabs of the present invention are more efficient, as disclosed herein, than the complicated latches 39 and 49 of Donnelly '088.

As in the prior art, the candle deck can be stored on the underside of the base when not in use, however, in this invention, the attachment is by connecting the sliding connecting units tabs of the candle deck with corresponding sliding twist lock connecting units in the bottom of the cake platter base, similar to the sliding connecting units also employed at the top of the cake cover enclosure.

For small sanitary cupcake covers for individual cupcakes, with removable candle deck, FIGS. 17 and 18 of Donnelly '088 illustrate the features of the present invention, but they are implemented differently. Knob 340, nuts 348 and 368, and threaded rod 360 of Donnelly '088 are not used. Instead, an integral handle with a removable candle deck, or optionally spring clips, are preferably used to attach the candle deck, both atop the cupcake cover for use, or below the base for storage.

BRIEF DESCRIPTION OF THE DRAWINGS

The present invention can best be understood in connection with the accompanying drawings. It is noted that the invention is not limited to the precise embodiments shown in the following drawings, in which:

FIGS. 10 and 11 relate to a sanitary cover for cupcakes, wherein:

FIG. 10 is a perspective exploded view showing the parts and configuration of a sanitary cupcake cover of this invention; and, is FIG. 11 is a top plan view of the candle deck of the sanitary cupcake cover.

FIGS. 12 and 13 relate to an alternate embodiment for a sanitary cover for cupcakes, wherein:

FIG. 12 is a perspective exploded view showing the parts and configuration of a sanitary cupcake cover of this invention; and, FIG. 13 is a top plan view of the candle deck of the sanitary cupcake cover.

DETAILED DESCRIPTION OF THE DRAWINGS

Figure 1:
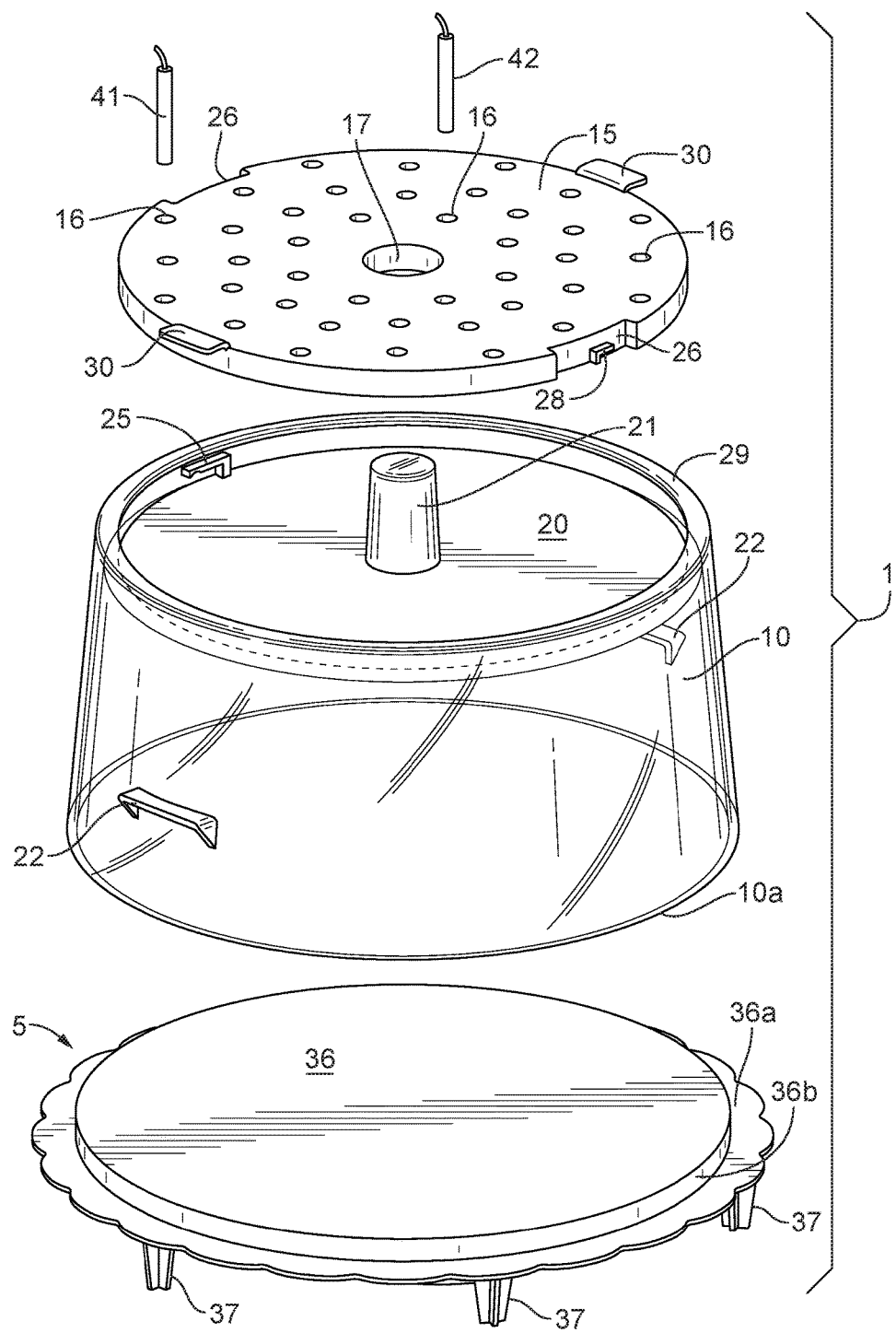
FIG. 1 is an exploded perspective view of the three major parts of a sanitary cake cover of this invention.

FIG. 1 shows the three major parts of the sanitary cover for cakes 1, such as a multi-slice full size cake. The base platter 5 with optional raised legs 37 serves as a platter for the cake, as well as a storage compartment underneath for the candle deck 15 when not in use. The cake cover 10 is shown atop the base platter 5. Optional side support gripping handles 22 are provided on opposite sides of cake cover 10. The candle deck 15 is removably positioned above, and is lockable to cover 10, supported upon recessed upper support surface 20 of cake cover 10, and inside of raised rim 29 of cake cover 10. Lifting handles 30 are provided on opposite sides of candle deck 15, to lift candle deck off of recessed upper support surface 20 of cake cover 10. The candle deck 15 includes an array of full or partial recess through holes 16 for insertion of candles 41, 42 therein.

Figure 2:
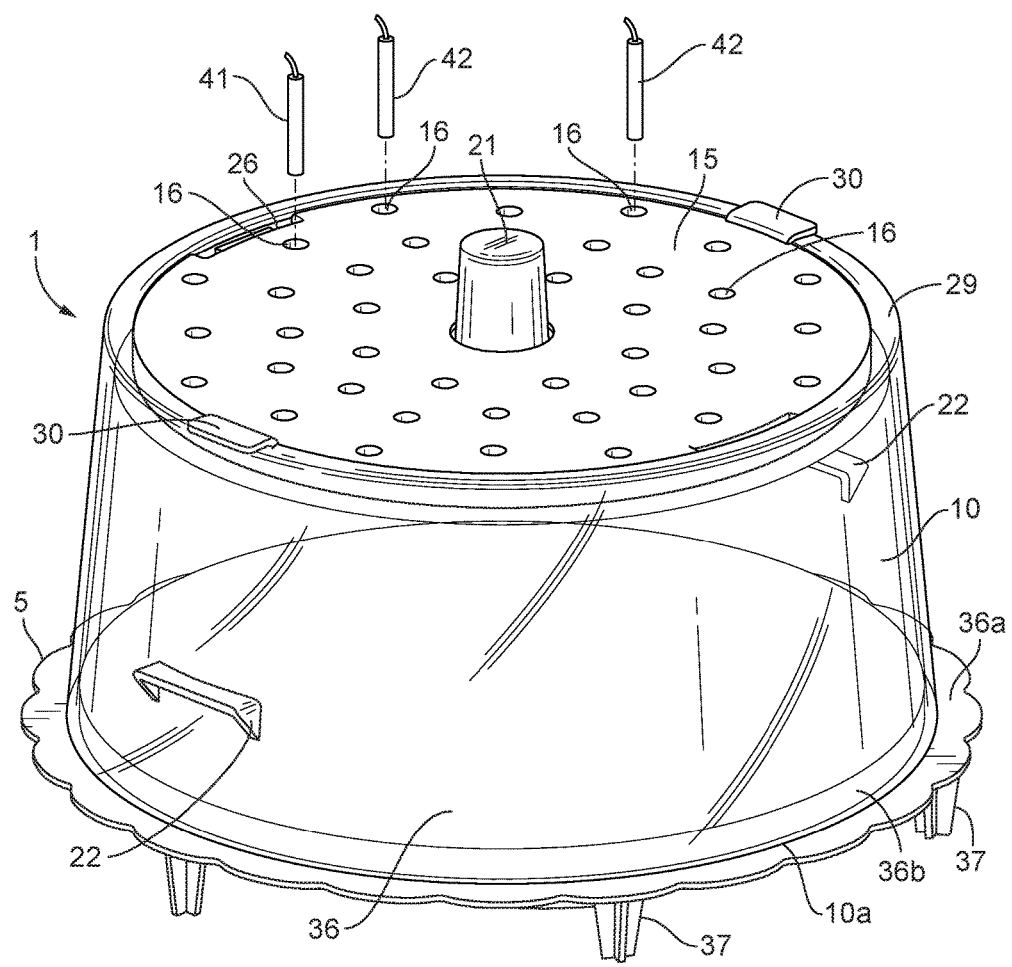
FIG. 2 is an assembly of the three parts of the sanitary cake cover shown in FIG. 1.

FIG. 2 shows the three parts of FIG. 1 assembled as a completed sanitary cake cover.

It is noted that candle deck 15 is shown in position for insertion of candles 41, 42 into holes 16 of candle deck 15, and sliding twist lock connecting interlock units 25 are cantilevered inward from rim 29 of the depression on top of cover 10 and spaced apart from central knob or handle 21 of cake cover 10.

FIGS. 1 and 2 also show more detail of cover 10. The central knob or handle 21 is integrally molded in the shape of a truncated cone. Candle deck 15 rests on flat surface 20 of cake cover 10 when in use; it is latched at locking connecting units 25, locking to sliding connecting tabs 28 of the candle deck 15. Side handles 22 are also illustrated.

FIGS. 1 and 2 shows base platter 5 with optional raised platter pedestal surface 36 is having outer flange 36a and upwardly extending cover accommodating circumferential shoulder wall 36b, to accommodate a bottom peripheral edge 10a of cake cover 10 upon pedestal surface 36, as well as optional legs 37 around the periphery. While flange 36a is shown as having a decorative scalloped edge, optionally flange 36a can be smooth, or have other repetitive geometric circumferential shapes.

Figure 3:
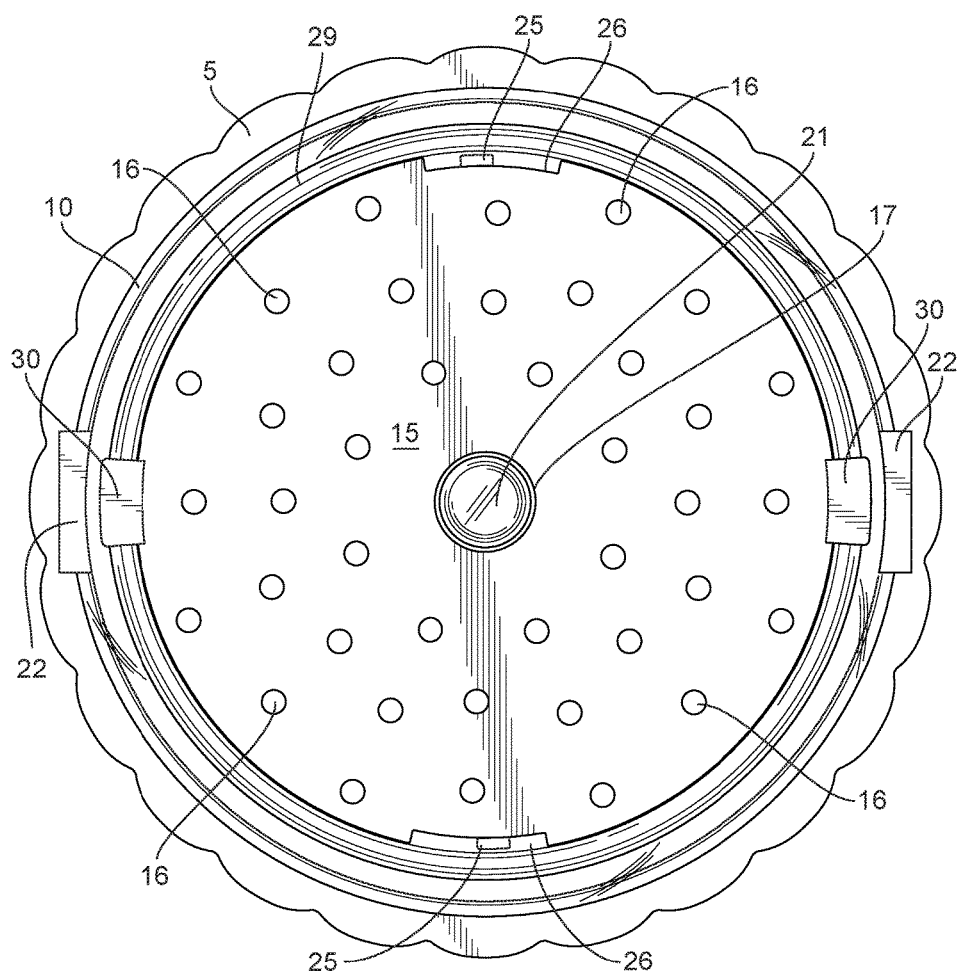
FIG. 3 is a top plan view of the three parts of the sanitary cake cover shown in FIGS. 1 and 2.

FIGS. 1, 2 and 3 also show candle deck 15 with central hole 17 to accommodate cover handle 21. Full or partial recess through holes 16 support candles. Handles 30 are used to hold and twist the candle deck 15 to interact with cantilevered locking connecting units 25 on the periphery of upper depressed cover rim 29, to lock or unlock. It is noted that these two locking connecting units 25 work in unison and interact with sliding locking tabs 28 of the candle deck 15, which emanate from notches on each side of the candle deck 15. The connecting operation is explained below in FIGS. 7-9. Handles 30 extend above rim 29.

Figure 4:
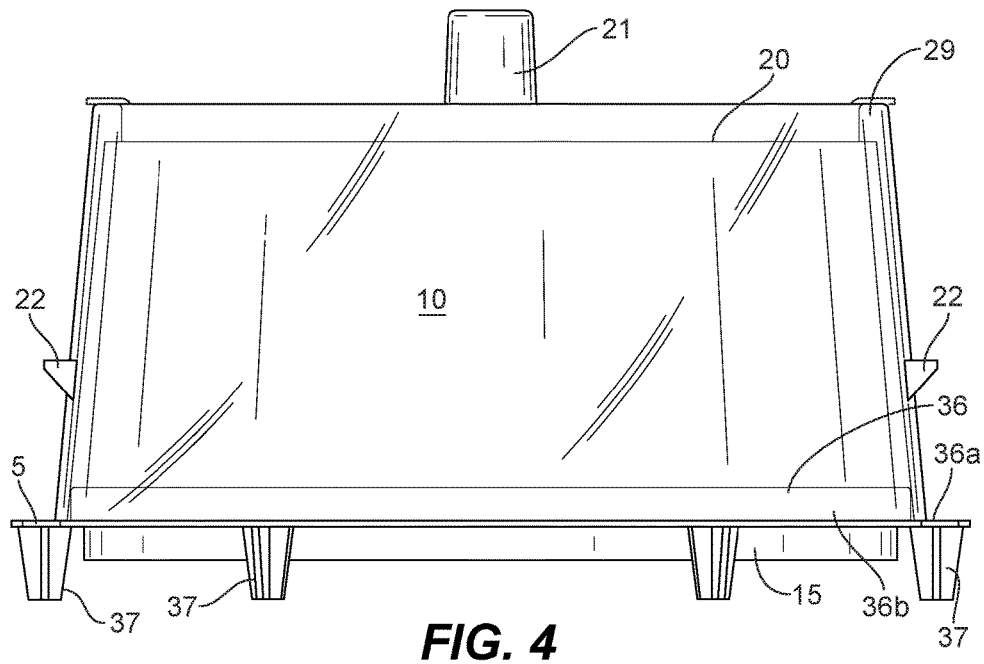
FIG. 4 is a front elevation view of the transparent sanitary cake cover; shown with a candle deck locked in a storage position underneath the base platter.
Figure 5:
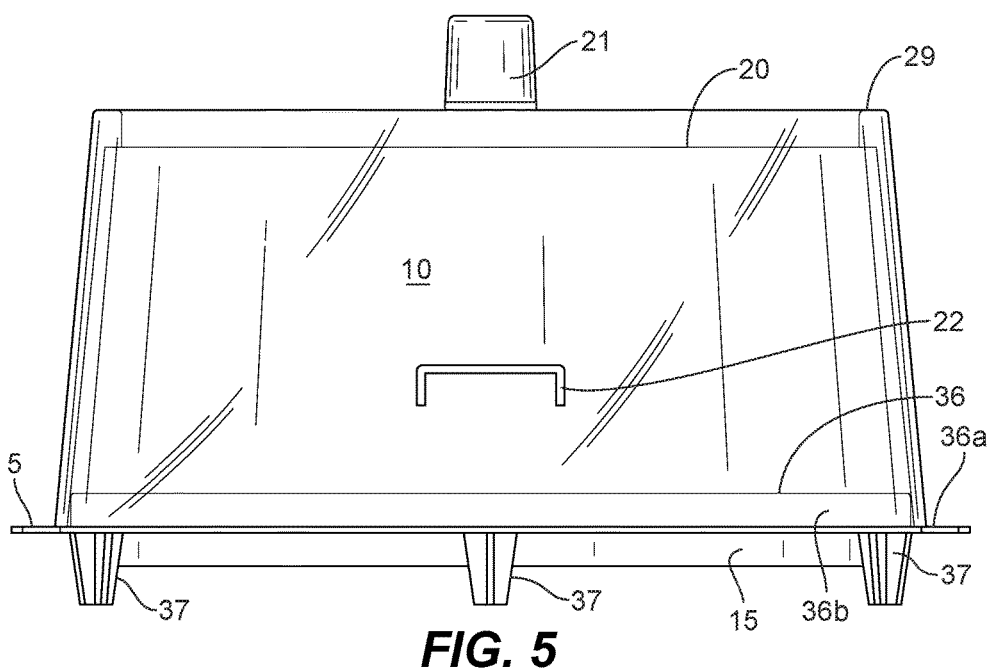
FIG. 5 is a right side elevation view of the sanitary cake cover; shown with a candle deck locked in a storage position underneath the base platter.

FIGS. 4 and 5 show cover 10 with handle 21 of cover 10 extending through hole 17 of the candle deck 15.

FIGS. 4 and 5 also show base platter 5 with support legs 37 extending down therefrom.

Figure 6:
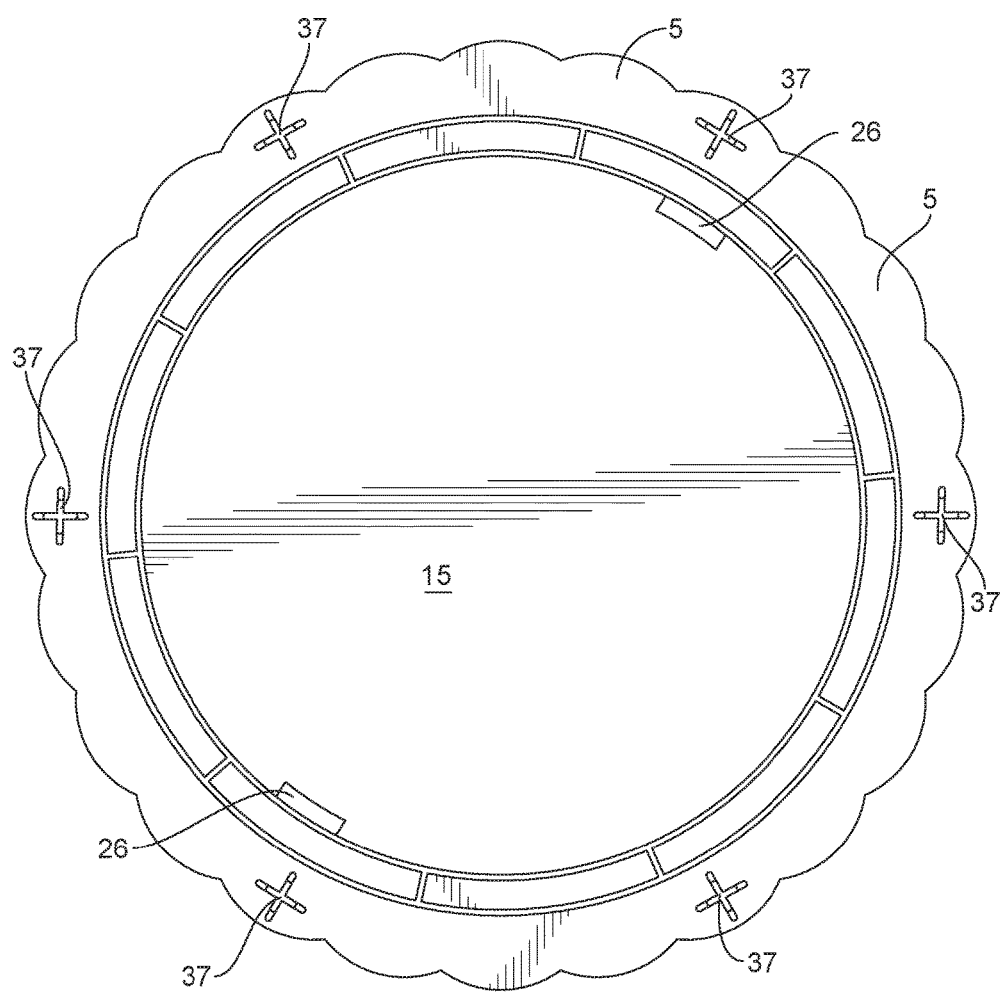
FIG. 6 is a bottom view of the base platter, shown with a candle deck locked in a storage position underneath the base platter.

FIG. 6 shows the underside of base platter 5 with candle deck 15 stored using a pair of locking connecting units 25 identical to those on the cake cover 10; here they are mounted on the inner edge of base platter 5.

The cake cover 10 may or may not be twist locked to the base platter 5 as per prior art. However, with the new twist lock candle deck 15 at the top, it would be beneficial for the cake cover 10 to be locked to the platform base platter 5, when operating the candle deck lock 25, to prevent the cake cover 10 from rotating with the candle deck 15, especially when the cake cover 10 is not twist locked to the base platter 5. If the cake cover 10 is twist locked to the base platter 5, the torque required to unlock the candle deck 15 should be coordinated, so as to move more freely, and be less than what is required to unlock the cake cover 10 from the platform base platter 5.

Figure 7:
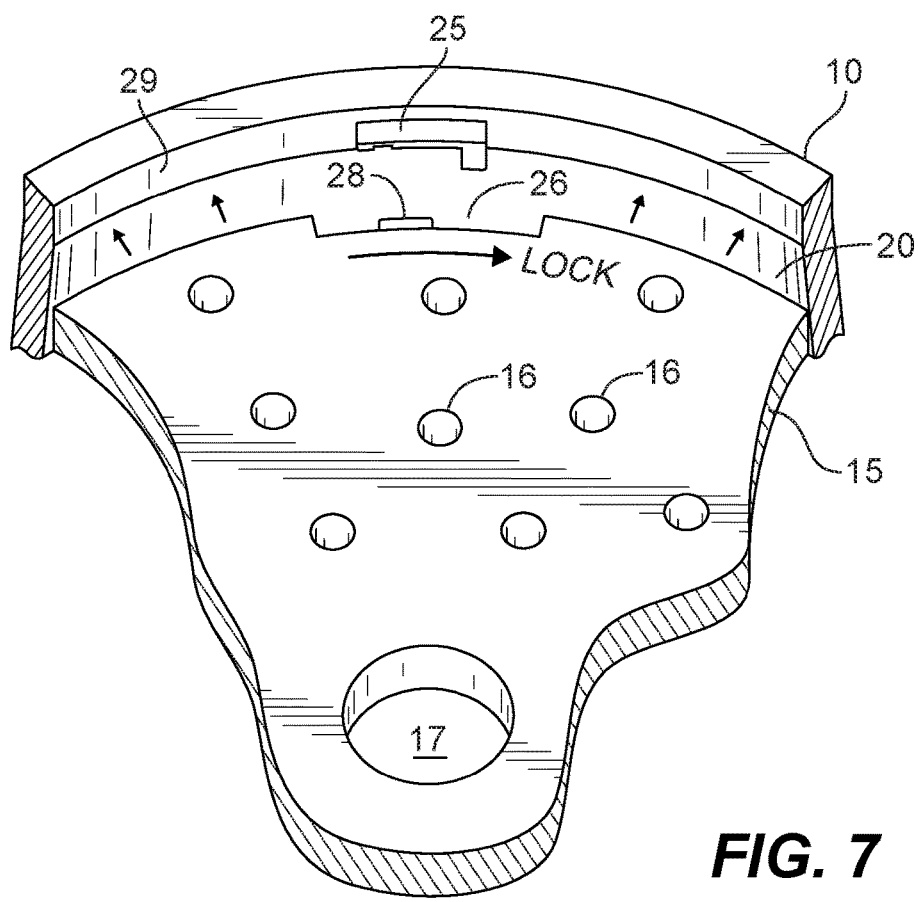
FIG. 7 is a close-up perspective detail view of a sliding twist lock connecting unit of the present invention shown in the dashed view circle line "7" of FIG. 4 herein, showing mating parts in the top inner rim of the cake cover's depressed recess located at the top of the cake cover, with the corresponding sliding tabs located at the outer rim of the candle deck.

FIG. 7 shows a detail of a locking connecting unit 25 attached to rim 29 of cover 10 (which can be molded in place as well) showing the relationship to locking tab 28 on candle deck 15. It is noted that in operation, candle deck 15 is positioned much closer to rim 29, but here in FIG. 7, it is spaced apart for clarity. It is also noted that space 26 is adjacent to tab 28; this space is required to permit deck 15 to drop down to surface 20 of the top of cake cover 10, by providing clearance for locking connecting units 25.

Figure 9:
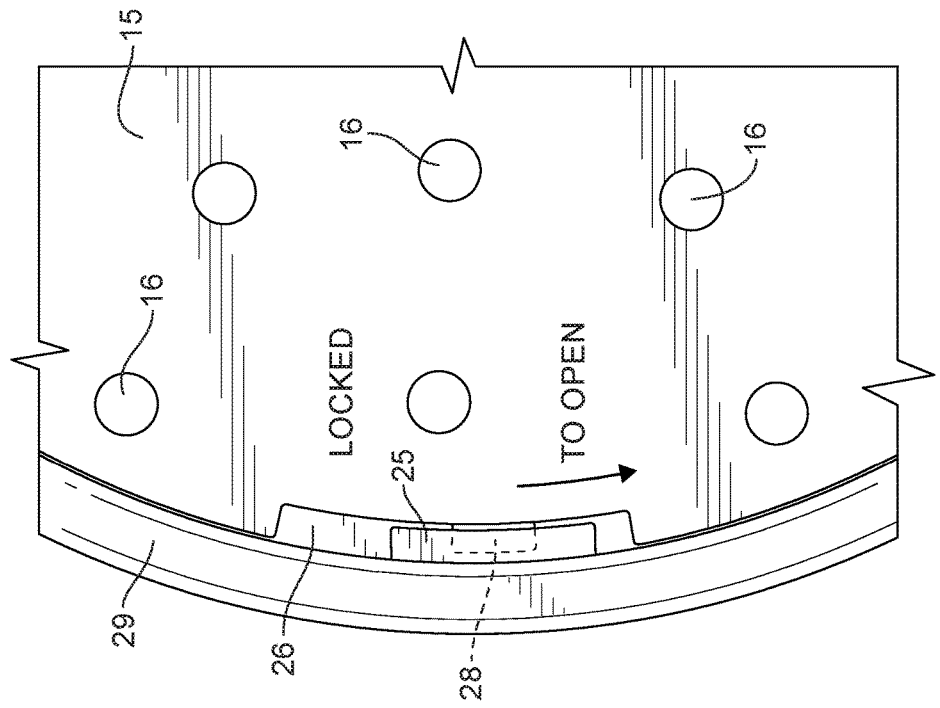
FIG. 9 is a top plan view of the sliding twist connecting lock of FIG. 8 after the transition to the locked position.
Figure 8:
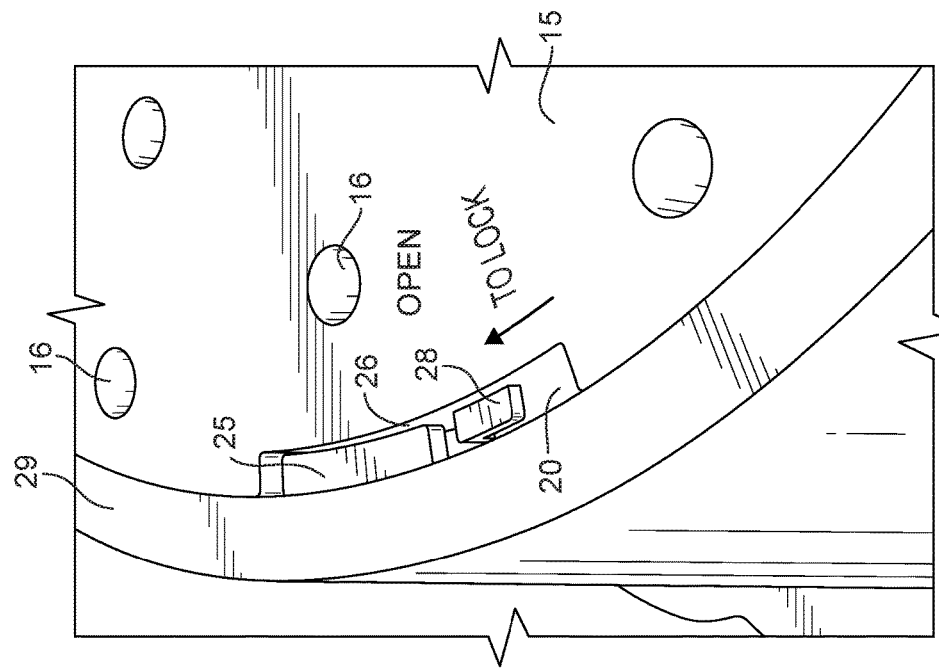
FIG. 8 is a top perspective detail view of one of the two candle deck's sliding twist connecting locking tabs, shown in the open position as, for example, the instant after the candle deck is dropped onto the depressed recess surface atop the cake cover.

FIG. 8 shows this relationship with the locking connecting units 25 in space 26 and the deck 15 is resting on the flat floor surface 20 of the top of the cover 10. By rotating candle deck 15 clockwise relative to cover 10, it is locked to the cake cover 10, as shown in FIG. 9.

Figures 10, 11:
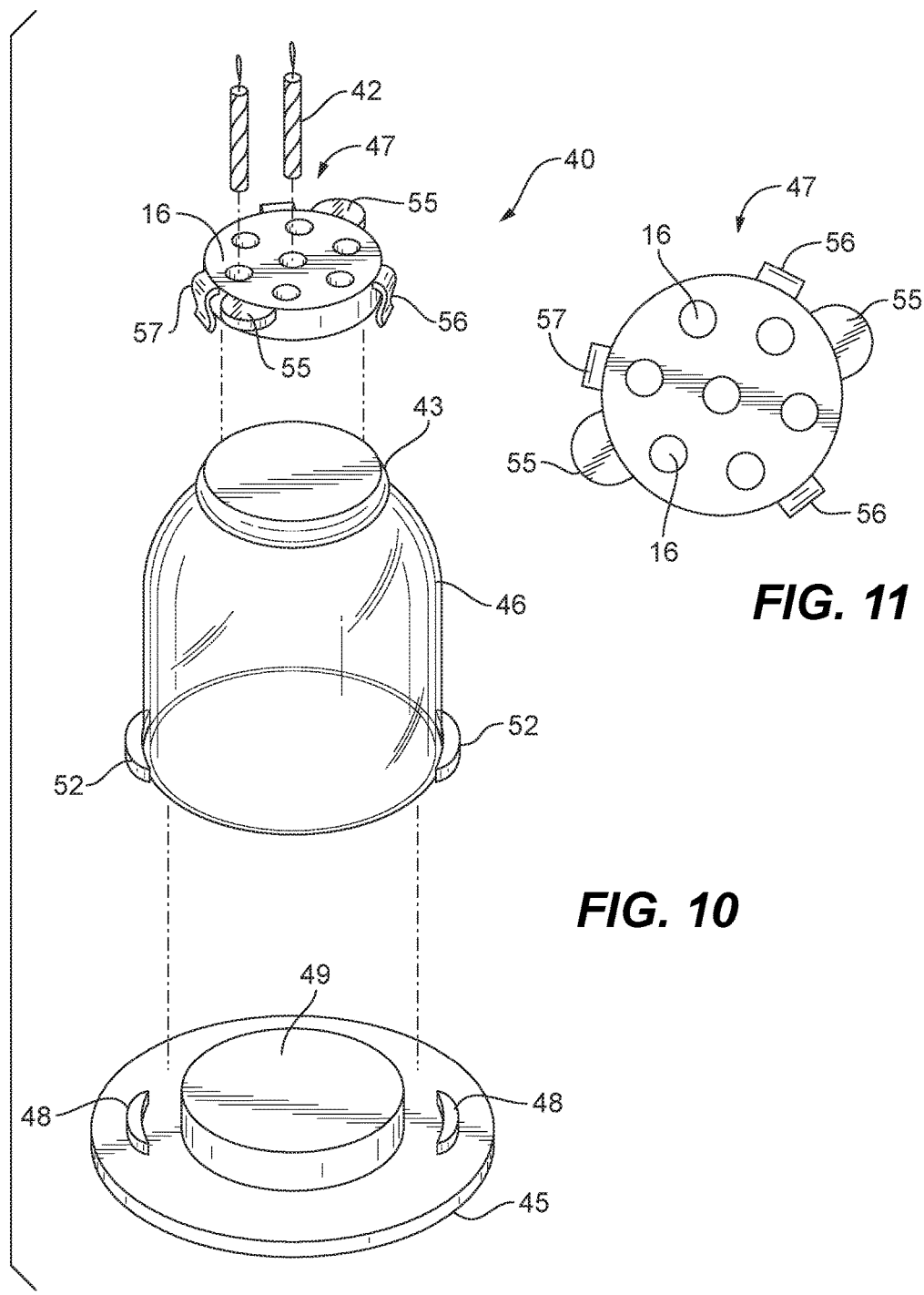

FIG. 10 shows an alternate embodiment for a small sanitary cover for a cupcake.

FIG. 11 shows details of the candle deck twist locked to the cupcake cover. Since this is likely to be used by children individually, extra care to prevent toppling and possible burn injury has been taken. Base platter 45 has a wide diameter to reduce chances of toppling; it is also removably secured to cover 46 via latch parts 48 on each side of raised cupcake pedestal rest 49. The mating latch parts 52 are attached to cover 46 or they can be similar to the twist latches of Donnelly '088 mentioned above, or any other functional clasping design, which can also be used in the full scale cover unit of FIGS. 1-9. The domed top of cover 46 is sealed with a flat surface with a rim 43 around it. The rim 43 has an outer surface cross section of a circular shape. While the twist lock connecting units 25, of FIGS. 1-9, can be also used on a cupcake cover or underneath base platter 45, this may be impractical in some situations because of the limited circumference size of the cupcake cover and candle deck. In such a situation, alternatively other locks, such as integral snap locks 56 and 57 can be used. For example, the candle deck 47 snaps on and off rim 43. Operation is simple. To install candle deck 47, handles 55 are grasped and front clip 57 is placed over rim 43. Then spring clips 56 are placed in contact with rim 43 and handles 55 are pushed down until clips 56 snap over. Removal is just the reverse.

Likewise, instead of being held in place by the sliding twist lock connecting units 25, and locking tabs 28, both of FIGS. 1-9 herein, larger candle decks can be alternatively removably attached to large cake covers with similar integral snap locks 56 and 57 (not shown). Additionally, optional latch parts 48 shown in FIG. 10 can be employed to secure the full size cake cover 10 of FIGS. 1-9 to base platter 5.

It is noted that in the small cupcake sanitary cover 40, all parts are attached to minimize toppling. Candles 41 and 42 are securely seated in recess or through holes 16. While candle deck 47 can be easily snapped on or off, the spring constant of clips 56 can be selected to make it difficult for a small child to manipulate while still being convenient for adults. Clips 56 and 57 can be integrally molded. A rim feature like rim 43 is provided inside base 45 (under pedestal rest 49) to facilitate storage for deck 47. Furthermore, if legs 37, shown elevating base platter 5 above the surface upon which is placed in FIG. 3, are employed on the bottom of cupcake base platter 45 of FIG. 10, and the cupcake. cover 40 has sliding locks on the bottom of cupcake base platter 45, such as sliding lock tabs 28 slidably engageable with sliding lock units 25 of FIGS. 7-9, then the cupcake candle deck 47 of FIGS. 10 and 11 can be stored underneath base platter 45. The storage of cupcake candle deck 47 beneath cupcake base platter 45 would be in a similar storage configuration shown in FIG. 6 of full size candle deck 15 underneath full size base platter 5.

Figures 12, 13:
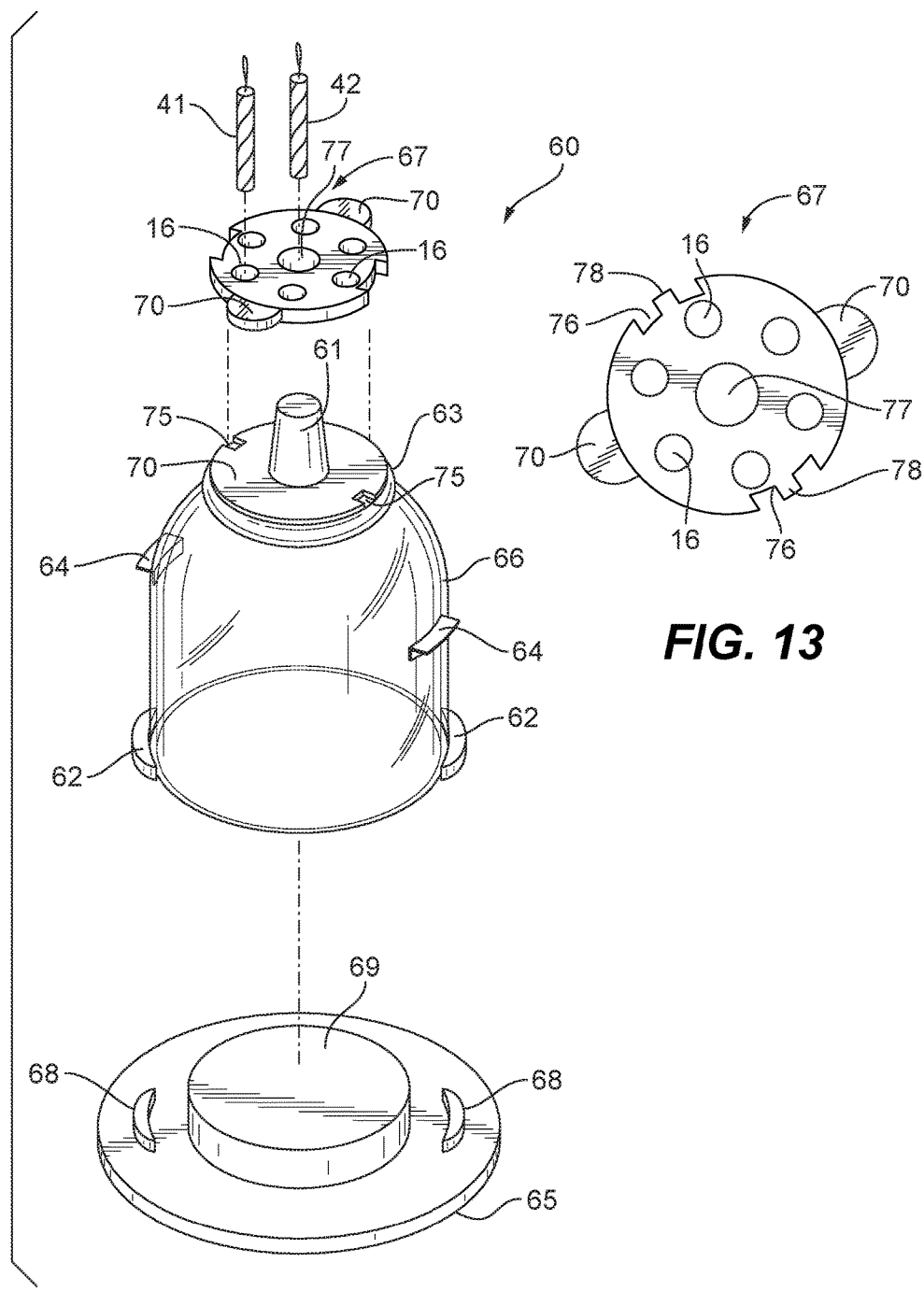

FIG. 12 shows an alternate embodiment for a small sanitary cover assembly 60 for a single small cupcake. FIG. 13 shows details of the candle deck 67, which is twist locked to the cupcake cover 66. Candles 41 and 42 are securely seated in recess or through holes 16 of candle deck 67. Since this is also likely to be used by children individually, extra care to prevent toppling and possible burn injury has been taken. Base platter 65 has a wide diameter to reduce chances of toppling; it is also optionally latched to cover 66 via latch parts 68 on each side of cupcake rest 69. The optional mating latch parts 62 are attached to cover 66 or they can be similar to the twist latches of Donnelly '088 mentioned above, or any other functional clasping design, which can also be used in the full scale cover unit of FIGS. 1-9.

The truncated horizontal rim top of cover 66 is sealed with a flat surface 70, with a depressed recess rim 63 around it. The rim 63 has an outer surface of a circular shape. Full or partial recess through holes 16 support candles 41 and 42 upon candle deck 67, which is removably attachable to transparent cake cover 66.

Handles 70 are used to hold and twist the candle deck 67 to interact with cantilevered locking connecting units 75 on the periphery of upper depressed cover rim 63, to lock or unlock. It is noted that these two locking connecting units 75 work in unison and interact with sliding locking tabs 78 of the candle deck 67, which emanate from notches 76 on each side of the candle deck 67. Handles 70 extend above cover rim 63.

It is also noted that space 76 is adjacent to tab 78; this space is required to permit deck 67 to drop down to surface 70 of the top of cake cover 60, by providing clearance for locking connecting units 75. FIG. 12 also shows this relationship with the locking connecting units 75 in space 76 and the deck 67 is resting on the flat floor surface 70 of the top of the cover 66. By rotating candle deck 67 clockwise relative to cover 66, it is locked to the cake cover 66.

Cover 66 includes a molded or otherwise permanently attached handle 61, preferably in the shape of a truncated cone. Candle deck 67 is provided with central hole 77 to accommodate integral cover handle 61 extending up from top flat surface 70 of cupcake cover enclosure 66. Candle deck 67 rests on flat surface 70 of cake cover 66 when in use; it is latched at locking connecting units 75 of cover 66, locking to sliding connecting tabs 78 of the candle deck 67. Side handles 64 are also illustrated on the opposite arcuate exterior wall portions of cover 66.

Base platter 65 has a wide diameter to reduce chances of toppling; it is also optionally latched to cover 66 via latch parts 68 on each side of cupcake rest 69. The mating latch parts 62 are attached to cover 66.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing from the scope of the invention.

We claim:

1. In combination, an improved sanitary cake cover comprising:
    a protective transparent cover for, and in combination with, a cake comprising a side wall and a top surface;
    a base having a raised platter pedestal surface supporting said cake within said cover, said cover being supported on a flange outwardly extending from a bottom edge of said raised platter pedestal surface;
    a candle deck removably positioned within a recess formed in said top surface of said cover, said candle deck having at least one full or partial recess for supporting a candle therein, said recess being surrounded by an upwardly extending rim; wherein the improvement comprises:
    said candle deck having connecting tabs along a circumference thereof for slidable engagement with connecting units mounted on adjacent surfaces of said rim for allowing engagement or disengagement of said tabs with said connecting units for locking and unlocking said candle deck, respectively, in said recess; and
    said top surface of said cover having an upwardly extending knob or handle passing through an opening in said candle deck for removing said cover along with said candle deck from said base to allow access to said cake.

2. The combination of claim 1 wherein said knob or handle is integrally molded in said top surface of said cover.

3. The combination of claim 1 wherein said base has a plurality of support legs providing a hollow space under said base for storage of said candle deck when not in use, said base having locking connecting units for making sliding engagement and disengagement with said connecting tabs on said candle deck.

4. The combination of claim 1 wherein said candle deck has an outwardly extending handle for twisting said candle deck between engagement and disengagement of said tabs with said connecting units, said outwardly extending handle overlapping said rim.

5. The combination of claim 1 wherein said candle deck includes a plurality of hollow candle holders extending from a surface of said candle deck.

6. The combination of claim 1 wherein said transparent cover has gripping handles on an outer surface of said side wall for lifting or placing said transparent cover from or on said base.

7. In combination, an improved sanitary cover for a single cupcake comprising:
 a protective transparent cover for said cupcake comprising a side wall and a domed top with a flat surface surrounded by a rim of circular cross section;
 a base having a raised cupcake pedestal rest supporting said cupcake within said cover, said cover being supported on a flange outwardly extending from a bottom edge of said raised cupcake pedestal rest; wherein the improvement comprises:
 mating latch parts along a bottom edge of said cover and a top surface of said flange for allowing slidable engagement and disengagement of said cover to said flange by rotation of said cover;
 a candle deck removably positioned on said flat surface of said domed top of said cover using integral snap locks mounted on an outer surface of said candle deck to engage or disengage with said rim of circular cross section surrounding said flat surface of said domed top; and
 handles on outer surfaces of both said candle deck and said cover for use in assembling and disassembling said candle deck and said cover, respectively.

8. The combination of claim 7 in which said candle deck includes a plurality of hollow candle holders extending from a surface of said candle deck.

9. The combination of claim 8 in which said flat surface of said domed top has an integral cover handle extending upward which extends through a central opening of said candle deck.

10. An improved method of presenting a cake having one or more candles thereon comprising the steps of:
 providing a cake on a raised platter pedestal surface of a base covered by a protective transparent cover comprising a side wall and a top surface on said base completely enclosing said cake;
 providing a candle deck removably positioned within a recess formed in said top surface of said cover, said candle deck having at least one full or partial recess for supporting a candle therein, said recess being surrounded by an upwardly extending rim,
 wherein the improvement comprises said candle deck having connecting tabs along a circumference thereof for slidable engagement with connecting units mounted on adjacent surfaces of said rim for allowing engagement or disengagement of said tabs with said connecting units for locking and unlocking said candle deck, respectively, in said recess;
 using an upwardly extending knob or handle on said top surface of said cover passing through an opening in said candle deck for removing said cover along with said candle deck from said base to allow access to said cake;
 removing said candle deck from said recess;
 placing said candle deck on a top surface of said cake; and
 mounting one or more candles on said candle deck in preparation for presenting said cake.

11. The method of claim 10 wherein said knob or handle is integrally molded in said top surface of said cover.

12. The method of claim 10 wherein said base has a plurality of support legs providing a hollow space under said base for storage of said candle deck when not in use, said base having locking connecting units for making sliding engagement and disengagement with said connecting tabs on said candle deck.

13. The method of claim 10 wherein said candle deck has an outwardly extending handle for twisting said candle deck between engagement and disengagement of said tabs with said connecting units, said outwardly extending, handle overlapping said rim.

14. The method of claim 10 wherein said candle deck includes a plurality of hollow candle holders extending from a surface of said candle deck.

15. The method of claim 10 wherein said transparent cover has gripping handles on an outer surface of said side wall for lifting or placing said transparent cover from or on said base.

16. An improved method for presenting a single cupcake comprising the steps of:
 providing a protective transparent cover for said cupcake comprising a side wall and a domed top with a flat surface surrounded by a rim of circular cross section;
 providing a base having a raised cupcake pedestal rest supporting said cupcake within said cover, said cover being supported on a flange outwardly extending from a bottom edge of said raised cupcake pedestal rest;
 wherein the improvement comprises providing mating latch parts along a bottom edge of said cover and a top surface of said flange for allowing slidable engagement and disengagement of said cover to said flange by rotation of said cover;
 removably positioning a candle deck on said flat surface of said domed top of said cover using integral snap locks mounted on an outer surface of said candle deck to engage or disengage with said rim of circular cross section surrounding said flat surface of said domed top;
 using handles on outer surfaces of both said candle deck and said cover for removing said cover from said cupcake and disassembling said candle deck from said cover;
 placing said candle deck on said cupcake;
 mounting one or more candles on said candle deck; and
 presenting said cupcake.

17. The method of claim 16 in which said candle deck wherein said candle deck includes a plurality of hollow candle holders extending from a surface of said candle deck.

18. The method of claim 17 in which said flat surface of said domed top has an integral cover handle extending upward which extends through a central opening of said candle deck.

* * * * *